(No Model.)

F. W. MARSTON.
ROLLING BEARING.

No. 260,585. Patented July 4, 1882.

Witnesses:    Inventor:

UNITED STATES PATENT OFFICE.

FRANK W. MARSTON, OF BOSTON, MASSACHUSETTS.

ROLLING BEARING.

SPECIFICATION forming part of Letters Patent No. 260,585, dated July 4, 1882.

Application filed March 12, 1881. (No model.)

*To all whom it may concern:*

Be it known that I, FRANK W. MARSTON, a citizen of the United States, residing in Boston, Massachusetts, have invented certain new and useful Improvements in Rolling Bearings; and I do hereby declare that the same are fully described in the following specification and illustrated in the accompanying drawings.

This invention relates to the class of rolling bearings for rotary journals, and has for its objects the material reduction of friction in such mechanism, the greater permanence and durability of the parts, and the simplification and cheapening of the apparatus.

A well-known form of rolling bearing has a series of cylindrical rollers occupying the annular space between the journal and the tubular box which incloses it, and having a rolling contact with both. A fatal objection to this is that the small rollers rub with great friction against each other as they are rotated and carried around by the rotation of the journal. Another serious difficulty is the end friction of the rollers against the cap or shoulder that retains them in position, particularly noticeable in railway-axle boxes. My improvements are designed to remedy these defects, and to adapt such bearings to all the requirements of railway service and analogous uses.

My invention consists primarily in a journal-box with a rolling bearing, having interposed between the cylindrical rollers a series of separate sliding anti-friction boxes, less in height than the diameter of such rollers, and by alternating with them preventing their contact with each other and keeping them exactly parallel with the axle.

My invention also consists in such a journal-box or rolling bearing provided with an anti-friction end bearing for the axle and the series of rollers.

My invention further consists in the combination, with such rolling bearing, of a steel sleeve entirely surrounding the journal, which sleeve may be hardened to make a better rolling surface, and may extend inwardly between the wheel and the axle, in which case it forms the wheel-seat. Its inside diameter may be larger than the journal, in which case I interpose a thin sleeve of paper, rubber, soft metal, or other substance suitable to break the direct connection between the track and the journal, which, long continued, tends to crystallization of the journal and its ultimate ruin, but which tendency is entirely averted by interrupting the connection as I now propose.

It will be understood that in the use of my invention two or more bearings are required within which the rotary journal may turn.

Figure 1:
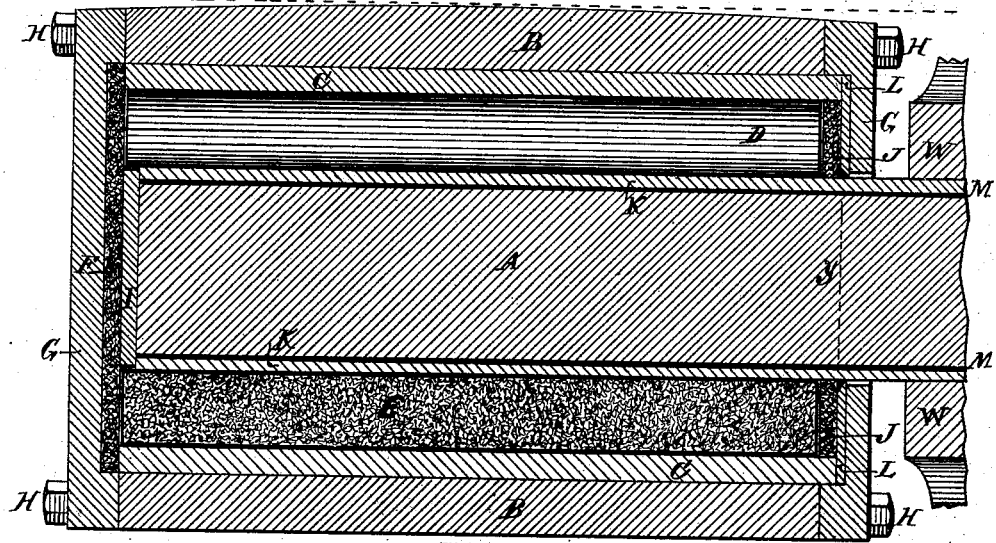
Figure 2:
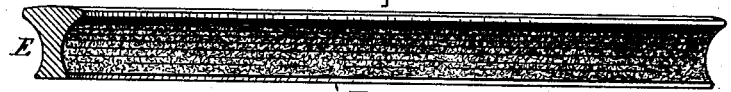
Figure 3:
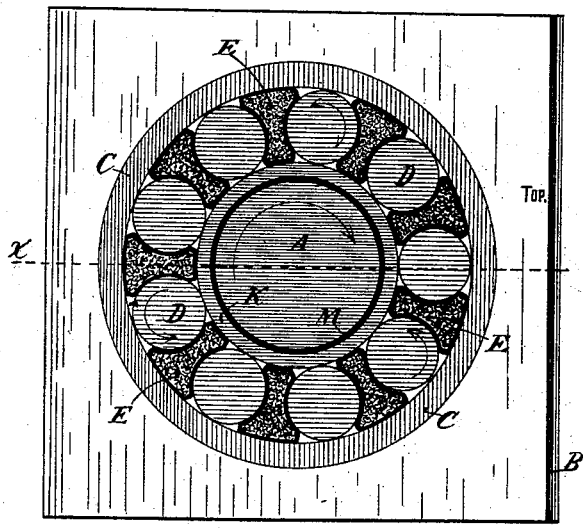
Figures 4, 5:
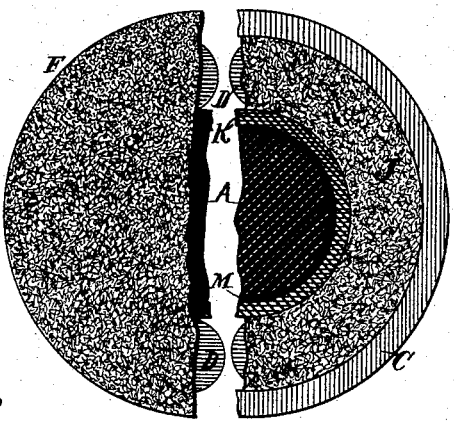

The drawings illustrate my invention as applied to a railway-car axle-box, and show the best manner in which I have contemplated applying its principle thereto, Figure 1 being a longitudinal section of the journal and box, and Fig. 2 is a perspective view of one of the sliding anti-friction boxes. Fig. 3 is a transverse section of the axle and box. Fig. 4 represents the end bearing with the end cap removed. Fig. 5 is a section of the journal on the line *y*, showing the positions of the annular and tubular bearings.

In the drawings, A is the axle, and B the cast-iron shell inclosing its bearing. C is the metallic bearing secured within the shell B, and having its concavity accurately turned to the precise diameter and true cylindrical character required.

It is obvious that the parts B and C may be cast integral, of material suitable for the bearing-surface C.

D D are the series of rollers interposed between the axle and the bearing-surface C, and E E are the sliding boxes similarly interposed and alternating with said rollers, as shown in Fig. 3, where the preferred form is clearly indicated. The rollers D are of steel, turned and ground to a uniform diameter, in order that proper hardness and true cylindricity may be secured and maintained, and they may each consist of two or more cylinders placed end to end. The boxes E E should present an anti-friction surface to the rollers, and may be made of any of the well-known metallic alloys, such as Babbitt metal or the various brass compositions, with proper lubrication. I have also used a compound of graphite and rubber, known as "Mayall's anti-friction metal," which has the requisite hardness and cheapness, together with admirable lubricating qualities, and may be used with little or no oil. These boxes do not directly rotate upon their axes, but travel around the axle with the rollers D D in the annular space which they occupy, this revolution being due to the pressure of the rotary axle A upon the rollers D, causing them to roll upon the bearing C, while the boxes E, being of less height, are relieved of the direct weight and slide freely between the axle, the bearing, and the rollers. The anti-friction character of the boxes greatly facilitates the rolling action of the parts in contact with them, due largely to the fact that they slide freely rather than rotate. With this construction any of the rollers D or boxes E may be separately removed, if occasion requires, without at all disturbing the others or dismounting the bearing, and their independence of action is complete.

F represents a disk of anti-friction material of the same character as the boxes E, and placed at the end of the axle A and the rollers D, that there may be no perceptible friction at those points. The disk is held in position by the iron cap G and the screw-bolts H entering the shell B. A disk or washer, I, made of hardened and highly-polished steel, and interposed between the end of the axle and the disk F, will be exceedingly useful, especially if the latter disk, on which it will naturally turn, is of the same character, since if slightly lubricated they serve to reduce the friction to a minimum, and to prevent all wear upon the end of the axle. The other ends of the rollers D bear against an annulus, J, of like anti-friction character, surrounding the axle. A leather or other flexible washer, L, beveled at its inner edge, is placed next to the annulus J as a dust-guard. Said annulus and washer may be made in two semicircular parts for convenience of removal without disturbing the box; or the flexible washer may be severed at one point and readily removed and replaced by springing its ends in opposite directions.

The axle-box complete, as above described, is mounted with its springs in the usual way in the pedestal or hanger attached to the truck or frame.

A rolling bearing somewhat analogous to mine is set forth in the Patent No. 34,295, granted February 4, 1862, to W. Duchemin, for hoisting-block. In that case, however, the axial spindle was, as usual, stationary, and the rollers did not rotate upon it, but upon a loose interposed sleeve. No end bearing for the spindle was had, and none interposed between the ends of the rollers and the inclosing box or cap. The construction and mode of operation was therefore widely different from mine, as was the pulley-block patented by Burnap, December 10, 1867, No. 71,973, in which the several rollers are placed in pockets in a guide-frame which revolves with them around the stationary spindle by reason of the rotation of the sheave.

It is obvious that a rotary journal must have two or more bearings to support it, and within which it turns, and must project at one or both sides of each bearing to connect with the power that gives rotation; also, that it must have one or more fixed wheels or their equivalent—a crank, for instance—to impart rotary motion to it. This is true of all adaptations of such journals, whether they be car-axles or lines of shafting, &c. In the case of railroad-car axles the rotation of the fixed wheels on the tracks imparts a rotary motion to the journal, to which they are rigidly attached.

To avoid the necessity of a complete steel bearing, I sometimes form the cylindrical ends of the iron axle somewhat smaller than is customary, and over them secure a sleeve, K, of hard steel, extending from the end toward the center, to and preferably through the wheel-seat. This sleeve then becomes the wearing-surface of the bearing, upon which the rollers D roll, and is of such a nature as to resist wear and retain its position permanently, since with the rolling bearing herein described properly lubricated no heat will be developed by friction, tending to expand and loosen the sleeve.

Experience has shown that the vibration caused by the rotation and pounding of railway-car wheels upon the track tends to crystallization of the axle where it is united to the wheel W, and that this action, beginning at the periphery of the axle, gradually extends inward until the axis is reached and the tenacity of the metal destroyed. To counteract this tendency and avoid disintegration of the axle, I interpose between it and the steel sleeve a thin layer, M, of paper, leather-board, celluloid, or other suitable material, for the purpose of breaking the direct homogeneous connection between the axle and the track, and thereby preventing the crystallization of the former, without interfering with its durability or materially reducing its strength. A layer of copper or of lead between the axle and steel sleeve will accomplish my purpose.

I claim as of my invention—

1. The improved rolling bearing herein described, consisting essentially in the rotary journal A, the bearing C, the rollers D, revolving in contact with said journal and bearing, and the sliding boxes E, independent of each other and of the rollers D, arranged substantially as and for the purpose set forth.

2. The combination of the fixed axle-box, the hollow bearing therein, and the rotary journal with the alternating series of independently-removable rollers and sliding boxes moved round in the annular space between the axle-box and the journal by the rotation of the latter, substantially as set forth.

3. The fixed axle-box having the hollow bearing C, the journal A, revolving therein, and the interposed rollers and sliding boxes, arranged as shown, in combination with the end bearings, F J, interposed between the ends of the rollers and the cap or ring that secures them in position, for the purposes set forth.

4. The combination of an axle, a series of rollers surrounding it, and an inclosing box or bearing, with end bearings, F J, of anti-friction material, suitably held in position, for the purpose set forth.

5. The improved axle-box herein described, embodying the cylindrical journal A, the shell B, with properly-secured end caps, and the bearing C, in combination with the rollers D, interposed boxes E, end bearings, F J, and dust-guard L, for the purposes set forth.

6. An iron axle for railway-cars, provided with a cylindrical sleeve of hard steel secured permanently thereon, in combination with a rolling bearing having the alternating series of independent rollers D and boxes E, interposed between the axle and the inclosing box and in contact with both, for the purpose set forth.

7. An iron axle for railway-cars, provided with a cylindrical steel sleeve forming the wheel-seat, and separated from the axle by an interposed non-crystallizable layer, M, in combination with a car-wheel and bearing, substantially as and for the purposes set forth.

8. A set or pair of fixed axle-boxes, having hollow cylindrical bearings formed in them, and a rotary journal provided with one or more tight wheels mounted thereon, said journal extending into or through said bearings, in combination with a continuous series of alternating parallel rolls and sliding boxes interposed between each of said bearings and said journal, and moved around in the annular space between them by the rotation of the latter, substantially as set forth.

9. The improved mechanism herein described, consisting essentially of a set or pair of fixed axle-boxes having hollow cylindrical bearings connected by a rotary journal extending through them both and beyond one or both sides of each of said axle-boxes, said journal having rotation imparted to it by means of one or more tight wheels mounted thereon, in combination with an alternating series of continuous parallel rolls and sliding boxes within each bearing, all arranged substantially as and for the purpose set forth.

10. A rotary journal inclosed at or near each end by a fixed axle-box having a hollow cylindrical bearing therein, said journal having one or more tight wheels mounted thereon, by means of which it is rotated, in combination with an alternating series of continuous parallel rolls and sliding boxes interposed between each of said bearings and said journal, and moved round in the annular space between them by the rotation of the latter.

11. A rotary journal for railway-cars, having a disk or washer of hardened and polished steel interposed between its outer end faces and its anti-friction end bearings, in the manner and for the purpose substantially as described.

In testimony whereof I hereto affix my signature in presence of two witnesses.

FRANK W. MARSTON.

Witnesses:
A. H. SPENCER,
C. G. KEYES.